United States Patent
Martick

(10) Patent No.: US 8,983,902 B2
(45) Date of Patent: Mar. 17, 2015

(54) TRANSPARENT CACHING OF CONFIGURATION DATA

(75) Inventor: Christian Martick, Berlin (DE)

(73) Assignee: SAP SE, Walldorf (DE)

( * ) Notice: Subject to any disclaimer, the term of this patent is extended or adjusted under 35 U.S.C. 154(b) by 195 days.

(21) Appl. No.: 12/965,353

(22) Filed: Dec. 10, 2010

(65) Prior Publication Data

US 2012/0150796 A1 Jun. 14, 2012

(51) Int. Cl.
G06F 17/30 (2006.01)
H04L 29/08 (2006.01)

(52) U.S. Cl.
CPC ...... *G06F 17/3048* (2013.01); *G06F 17/30575* (2013.01); *H04L 67/1095* (2013.01); *H04L 67/34* (2013.01); *H04L 67/325* (2013.01)
USPC .......................................................... 707/610

(58) Field of Classification Search
USPC .......................................................... 707/610
See application file for complete search history.

(56) References Cited

U.S. PATENT DOCUMENTS

| | | | | |
|---|---|---|---|---|
| 6,145,066 A * | 11/2000 | Atkin | ............................ | 711/165 |
| 6,792,436 B1 * | 9/2004 | Zhu et al. | .............................. | 1/1 |
| 6,820,088 B1 * | 11/2004 | Hind et al. | ............................ | 1/1 |
| 6,950,823 B2 * | 9/2005 | Amiri et al. | .................... | 707/690 |
| 7,120,690 B1 * | 10/2006 | Krishnan et al. | ............. | 709/225 |
| 7,848,263 B2 * | 12/2010 | Chhabra | ........................ | 370/255 |
| 8,019,900 B1 * | 9/2011 | Sekar et al. | .................... | 709/248 |
| 8,271,830 B2 * | 9/2012 | Erofeev | ........................ | 714/6.23 |
| 8,312,410 B2 * | 11/2012 | Foster et al. | ................... | 716/136 |
| 2003/0140832 A1 * | 7/2003 | Ton et al. | .................. | 112/475.01 |
| 2004/0133538 A1 * | 7/2004 | Amiri et al. | ....................... | 707/1 |
| 2004/0153749 A1 * | 8/2004 | Schwarm et al. | ............... | 714/11 |
| 2004/0179511 A1 * | 9/2004 | Kizu et al. | ..................... | 370/350 |
| 2005/0043093 A1 * | 2/2005 | Takeuchi | ......................... | 463/40 |
| 2005/0091226 A1 * | 4/2005 | Lin et al. | ........................ | 707/100 |
| 2005/0102429 A1 * | 5/2005 | Pinhas et al. | ................... | 709/248 |
| 2005/0165735 A1 * | 7/2005 | Lin et al. | ............................. | 707/2 |
| 2005/0243857 A1 * | 11/2005 | Hofstaedter et al. | .......... | 370/447 |
| 2006/0132330 A1 * | 6/2006 | Youn | ........................ | 340/870.07 |
| 2007/0266198 A1 * | 11/2007 | Bousis | .............................. | 711/4 |
| 2008/0123558 A1 * | 5/2008 | Chhabra | ........................ | 370/254 |
| 2009/0254780 A1 * | 10/2009 | Mizuno | ........................... | 714/48 |
| 2009/0287746 A1 * | 11/2009 | Brown | ........................... | 707/203 |
| 2009/0287762 A1 * | 11/2009 | Gopal et al. | ................... | 709/203 |
| 2010/0114826 A1 * | 5/2010 | Voutilainen et al. | .......... | 707/638 |
| 2010/0211696 A1 * | 8/2010 | Bauer et al. | ................... | 709/248 |
| 2010/0238801 A1 * | 9/2010 | Smith et al. | .................... | 370/229 |
| 2011/0150008 A1 * | 6/2011 | Le Pallec et al. | ............. | 370/503 |

* cited by examiner

*Primary Examiner* — Richard Bowen
(74) *Attorney, Agent, or Firm* — Fish & Richardson P.C.

(57) ABSTRACT

The present disclosure involves systems, software, and computer implemented methods for providing transparent caching of configuration data in distributed landscapes. One process includes operations for receiving a read request of original configuration data stored at a second system. A first timestamp associated with local configuration data stored locally at a first system is identified. A second timestamp associated with the original configuration data is identified, and the second timestamp is determined to be later in time than the first timestamp. A copy of the original configuration data from the second system is retrieved for storage locally in place of the local configuration data at the first system based on the determination that the second timestamp is later in time than the first timestamp. The first timestamp is updated with a current timestamp associated with a time the copy of the original configuration data was retrieved from the second system.

21 Claims, 6 Drawing Sheets

TRANSPARENT CACHING OF CONFIGURATION DATA

TECHNICAL FIELD

The present disclosure relates to software, computer systems, and computer implemented methods for providing transparent caching of configuration data in distributed landscapes.

BACKGROUND

In some instances, business processes can be implemented using a plurality of systems in a distributed system landscape environment. Each system in the plurality of systems can be a server, client computer, or other computing device capable of providing functionality for performing tasks in association with a business process. Various systems may be needed for certain tasks in a business process. Some systems may store data used by other systems, or multiple systems may need to exchange information during implementation of the business process. Further, some systems may depend on other systems within the environment. Distributed system environments can require a common set of configuration data for the plurality of systems in order to implement a shared business process. Each of the tasks performed at the different systems in the environment may need to access the common configuration data in order to maintain consistency with respect to the overall parameters of the shared business process.

In some instances, the configuration data can be maintained, updated, and managed at a central system. The central system may be a dedicated system used as a central server to coordinate requests from other systems in the environment for the configuration data, for example. In instances where the central system may not be a dedicated server for managing configuration data, the system may still require specific software and interfaces for maintenance of configuration data used by multiple systems in the environment. In any event, the system used for managing the configuration data stores the configuration data for other systems to access. The other systems may send requests to the central system to retrieve configuration data or obtain the status of configuration data when needed at the remote systems. The central system arrangement may, however, require extensive resources and bandwidth requirements. Each time a remote system requires configuration data, the remote system communicates with the central system, regardless of whether the needed data has been updated. Accordingly, numerous communication messages may be transmitted to and from the central system, occupying network and processing resources.

SUMMARY

The present disclosure describes techniques for providing transparent caching of configuration data in distributed landscapes. A computer program product is encoded on a tangible storage medium, where the product comprises computer readable instructions for causing one or more processors at a first system to perform operations. These operations can include receiving a read request of original configuration data stored at a second system. A first timestamp associated with local configuration data stored locally at the first system is identified, wherein the first timestamp comprises a recorded time that the local configuration data was last updated. A second timestamp associated with the original configuration data is identified, wherein the second timestamp comprises a recorded time that the original configuration data was last updated. The second timestamp is determined to be later in time than the first timestamp. A copy of the original configuration data from the second system is retrieved for storage locally in place of the local configuration data at the first system based on the determination that the second timestamp is later in time than the first timestamp. The first timestamp is updated with a current timestamp associated with a time the copy of the original configuration data was retrieved from the second system.

In one implementation, the first system and the second system can be communicably coupled with identical persistence software modules. Further, retrieving the copy of the original configuration data can include retrieving only portions of the original configuration data that are different from the local configuration data. The second system can be designated as a controller system configured to manage the original configuration data for a plurality of other systems and the first system can be designated as a non-controller system.

In some implementations, the operations can further include receiving a request to designate the first system as a controller system, retrieving the original configuration data from the second system, storing the original configuration data locally, and activating a flag indicating that the first system is a controller system. The operations can also include identifying a change to the original configuration data, performing a write operation on the local configuration data to implement the change to the original configuration data, and storing cache metadata associated with the change, the cache metadata including a timestamp associated with a time the write operation was performed. Still further, the operations can also include receiving a request from the second system for refreshing configuration data stored at the second system, wherein the second system is designated as a non-controller system, and allowing the second system to retrieve configuration data stored locally at the first system. In certain implementations, the first system can include a cache management layer for maintaining persistence of configuration data stored at the first system.

While generally described as computer implemented software embodied on tangible media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
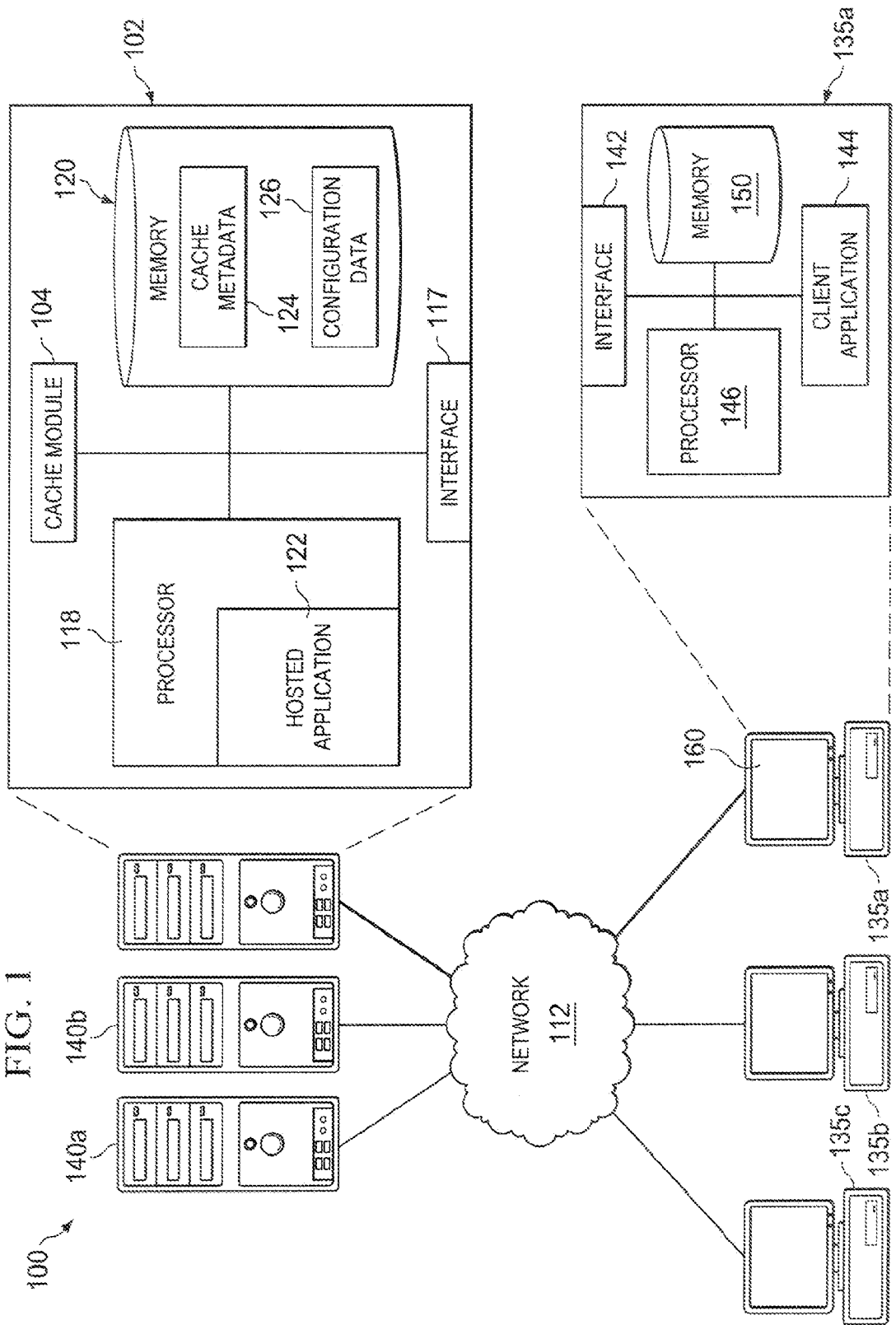
FIG. 1 illustrates an example environment for providing transparent caching of configuration data in distributed landscapes.

This disclosure generally describes computer systems, software, and computer implemented methods for providing transparent caching of configuration data in distributed landscapes. A plurality of systems can be connected through a network, each system in the network configured to potentially store and manage configuration data. As used in the present disclosure, each system in the plurality of systems can be a server or other computing device capable of storing data as well as receiving, processing, and transmitting requests for resources stored at the system. In general, a single system in the group of systems can be designated as a "controller" for the configuration data. The controller system assumes the functions for managing, updating, and handling requests for configuration data associated with a particular business process, application, or solution.

Each system associated with the business process can access the configuration data managed by the controller system by sending requests to the controller system. In some implementations, however, each of the systems also stores a copy of the configuration data locally and includes similar components as the components of the controller. Further, the same software for persistence can be used at all systems in the distributed landscape. At any given moment, each system storing configuration data can then be designated as the controller system for managing configuration data for the plurality of systems. Accordingly, a symmetric caching mechanism using existing persistence layers is provided for distributed landscapes.

Generally, one system is designated as a controller system at a given time. Although other systems also may store a copy of the configuration data, the controller system maintains the most current copy of the configuration data and performs updates to the configuration data stored at the controller system. Other systems may then query the controller system to determine whether a particular item in the configuration data has been updated at the controller system relative to the version of the particular item stored at the other systems. In other words, each system may store configuration data locally but only communicate with the controller system as necessary to update particular data items. As various systems perform tasks that modify the configuration data, the configuration data stored at the controller system is updated accordingly. Further, since multiple systems in the environment store the configuration data, the system designated as the controller system can relinquish its status as the controller system depending on the current context, and a different system can then be designated as the controller for the other systems. An internal "controller" flag at each system can be activated or deactivated depending on the current status of the system, i.e., whether the system is designated as a controller system or not. Accordingly, each system may have the capability to operate as the controller for the plurality of systems.

One potential benefit of providing transparent caching of configuration data in distributed landscapes is that available resources for a business process can be used more efficiently in some instances. In implementations in which the configuration data is stored solely at a central system, frequent requests and communications are transmitted to and from the central system in order for other systems to access the configuration data. In some instances, remote call times are lengthy due to the amount of data sent from the central system. The transparent caching implementation, however, allows each system in the distributed environment to access configuration data cached locally unless updated configuration data is required from the controller system. Accordingly, remote call times are minimized and network resources can be used for other purposes.

Further, since multiple systems in the environment can potentially assume the role of the controller system, different systems can be used as the controller system as needed. The same version of software can be distributed among the different systems to simplify and synchronize systems in a distributed landscape with respect to various sets of configuration data. Having multiple systems capable of operating as the controller system in a symmetric controller methodology may be beneficial when a particular system goes offline in emergency situations or when alternating systems used as the controller may be more efficient. In the transparent caching implementation, the systems can have the same coding and, accordingly, a lean cache management layer can be used. As a result, maintenance of code for the symmetric controller system can be simplified. A simple, scalable, and transparent methodology is implemented that can be suited to leverage the advantages of object oriented, modularized software patterns, and create a scalable caching environment.

Turning to the illustrated example, FIG. 1 illustrates an example environment 100 for providing transparent caching of configuration data in distributed landscapes. The illustrated environment 100 includes or is communicably coupled with one or more clients 135 or servers 102 and 140, at least some of which communicate across network 112. In general, environment 100 depicts an example configuration of one or more systems capable of storing, processing, and managing requests for configuration data. In some implementations, the transparent caching of configuration data of the present disclosure may be implemented in connection with a hosted application on a server, such as server 102, accessible to other servers 140a and 140b and/or a user at client 135a through a network 112. In certain instances, clients 135a-b and servers 102, 140a and 140b can be logically grouped and accessible within a cloud computing network. Accordingly, the service for providing transparent caching of configuration data in distributed landscapes may be provided as an on-demand solution through the cloud computing network as well as a traditional server-client system or a local application at client 135a.

In general, server 102 is any server that stores one or more hosted applications 122, where at least a portion of the hosted applications are executed via requests and responses sent to users or clients within and communicably coupled to the illustrated environment 100 of FIG. 1. For example, server 102 may be a Java 2 Platform, Enterprise Edition (J2EE)-compliant application server that includes Java technologies such as Enterprise JavaBeans (EJB), J2EE Connector Architecture (JCA), Java Messaging Service (JMS), Java Naming and Directory Interface (JNDI), and Java Database Connectivity (JDBC). In some instances, the server 102 may store a plurality of various hosted applications 122, while in other instances, the server 102 may be a dedicated server meant to store and execute only a single hosted application 122. In some instances, the server 102 may comprise a web server or be communicably coupled with a web server, where the hosted applications 122 represent one or more web-based applications accessed and executed via network 112 by clients of the server 102 to perform the programmed tasks or operations of the hosted application 122. As used in the present disclosure, clients of the server 102 can include other servers such as servers 140a and 140b that communicate with the server 102 for retrieving or caching of up-to-date configuration data. Clients of the server 102 can also include client computers 135a-c or other users associated with a business solution provided by servers 102, 140a and 140b.

At a high level, the server 102 comprises an electronic computing device operable to receive, transmit, process, store, or manage data and information associated with the environment 100. The server 102 illustrated in FIG. 1 can be responsible for receiving application requests from one or more client applications or business applications associated with other servers 140a and 140b or clients 135 of environment 100 and responding to the received requests by processing said requests in the associated hosted application 122, and sending the appropriate response from the hosted application 122 back to the requesting application. The server 102 may also receive requests and respond to requests from other components on network 112. Alternatively, the hosted application 122 at server 102 can be capable of processing and responding to local requests from a user accessing server 102 locally. Accordingly, in addition to requests from the external servers 140a and 140b and clients 135 illustrated in FIG. 1, requests associated with the hosted applications 122 may also be sent from internal users, external or third-party customers, other automated applications, as well as any other appropriate entities, individuals, systems, or computers. Further, the terms "client application" and "business application" may be used interchangeably as appropriate without departing from the scope of this disclosure.

As used in the present disclosure, the term "computer" is intended to encompass any suitable processing device. For example, although FIG. 1 illustrates only servers 102 and 140a and 140b, environment 100 can be implemented using additional servers, as well as computers other than servers, including a server pool. Indeed, servers 102 and 140a and 140b may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated servers 102 and 140a and 140b may be adapted to execute any operating system, including Linux, UNIX, Windows, Mac OS, or any other suitable operating system. According to one embodiment, server 102 may also include or be communicably coupled with a mail server.

In the present implementation, and as shown in FIG. 1, the server 102 includes a processor 118, an interface 117, a memory 120, and one or more hosted applications 122. The interface 117 is used by the server 102 for communicating with other systems in a client-server or other distributed environment (including within environment 100) connected to the network 112 (e.g., clients 135, servers 140a and 140b, as well as other systems communicably coupled to the network 112). Generally, the interface 117 comprises logic encoded in software and/or hardware in a suitable combination and operable to communicate with the network 112. More specifically, the interface 117 may comprise software supporting one or more communication protocols associated with communications such that the network 112 or interface's hardware is operable to communicate physical signals within and outside of the illustrated environment 100.

The server 102 may also include a user interface, such as a graphical user interface (GUI). The GUI comprises a graphical user interface operable to, for example, allow the user of the server 102 to interface with at least a portion of the platform for any suitable purpose, such as creating, preparing, requesting, or analyzing data, as well as viewing and accessing source documents associated with business transactions. Generally, the GUI provides the particular user with an efficient and user-friendly presentation of business data provided by or communicated within the system. The GUI may comprise a plurality of customizable frames or views having interactive fields, pull-down lists, and buttons operated by the user. For example, GUI may provide interactive elements that allow a user to select from a list of suggested entries for input into a data field displayed in GUI. More generally, GUI may also provide general interactive elements that allow a user to access and utilize various services and functions of application 122. The GUI is often configurable, supports a combination of tables and graphs (bar, line, pie, status dials, or other tables and graphs), and is able to build real-time portals, where tabs are delineated by key characteristics (e.g., site or micro-site). Therefore, the GUI contemplates any suitable graphical user interface, such as a combination of a generic web browser, intelligent engine, and command line interface (CLI) that processes information in the platform and efficiently presents the results to the user visually.

Generally, example server 102 may be communicably coupled with a network 112 that facilitates wireless or wireline communications between the components of the environment 100 (i.e., between the server 102 and other servers 140a and 140b or clients 135), as well as with any other local or remote computer, such as additional clients, servers, or other devices communicably coupled to network 112 but not illustrated in FIG. 1. In the illustrated environment, the network 112 is depicted as a single network in FIG. 1, but may be a continuous or discontinuous network without departing from the scope of this disclosure, so long as at least a portion of the network 112 may facilitate communications between senders and recipients. The network 112 may be all or a portion of an enterprise or secured network, while in another instance at least a portion of the network 112 may represent a connection to the Internet. In some instances, a portion of the network 112 may be a virtual private network (VPN), such as, for example, the connection between the client 135 and the server 102. Further, all or a portion of the network 112 can comprise either a wireline or wireless link. Example wireless links may include 802.11 a/b/g/n, 802.20, WiMax, and/or any other appropriate wireless link. In other words, the network 112 encompasses any internal or external network, networks, sub-network, or combination thereof operable to facilitate communications between various computing components inside and outside the illustrated environment 100.

The network 112 may communicate, for example, Internet Protocol (IP) packets, Frame Relay frames, Asynchronous Transfer Mode (ATM) cells, voice, video, data, and other suitable information between network addresses. The network 112 may also include one or more local area networks (LANs), radio access networks (RANs), metropolitan area networks (MANs), wide area networks (WANs), all or a portion of the Internet, and/or any other communication system or systems at one or more locations. The elements hosted by the server 102 may be implemented locally at other servers 140a and 140b or at a client 135.

Clients 135*a-b* may have access to resources such as server 102 within network 112. In certain implementations, the servers within the network 112, including server 102 and/or servers 140*a* and 140*b* in some instances, may comprise a cloud computing platform for providing cloud-based services. The terms "cloud," "cloud computing," and "cloud-based" may be used interchangeably as appropriate without departing from the scope of this disclosure. Cloud-based services can be hosted services that are provided by servers and delivered across a network to a client platform to enhance, supplement, or replace applications executed locally on a client computer. Clients 135*a-b* can use cloud-based services to quickly receive software upgrades, applications, and other resources that would otherwise require a lengthy period of time before the resources can be delivered to the clients 135*a-b*. Additionally, other devices may also have access to cloud-based services, such as on-demand services provided by servers accessible through network 112.

As described in the present disclosure, on-demand services can include multiple types of services such as products, actionable analytics, enterprise portals, managed web content, composite applications, or capabilities for creating, integrating, using and presenting business applications. For example, a cloud-based implementation can allow client 135 to transparently upgrade from an older user interface platform to newer releases of the platform without loss of functionality. In certain implementations, a particular client application may access a plurality of servers including servers 102, 140*a* and 140*b* through a network for on-demand services associated with a business process. In performing tasks to provide the on-demand services, some of the servers 140*a* and 140*b* may need access to configuration data maintained by a particular system, such as server 102, for example. The designation of one system as a controller for a distributed landscape may allow transparent and scalable caching of configuration data and efficient synchronization of multiple systems associated with the business process.

As illustrated in FIG. 1, server 102 includes a processor 118. Although illustrated as a single processor 118 in FIG. 1, two or more processors may be used according to particular needs, desires, or particular embodiments of environment 100. Each processor 118 may be a central processing unit (CPU), a blade, an application specific integrated circuit (ASIC), a field-programmable gate array (FPGA), or another suitable component. Generally, the processor 118 executes instructions and manipulates data to perform the operations of server 102 and, specifically, the one or more plurality of hosted applications 122. Specifically, the server's processor 118 executes the functionality required to receive and respond to requests from servers 140*a* and 140*b* and the clients 135*a-c* and their respective client applications 144, as well as the functionality required to perform the other operations of the hosted application 122.

Regardless of the particular implementation, "software" may include computer-readable instructions, firmware, wired or programmed hardware, or any combination thereof on a tangible medium operable when executed to perform at least the processes and operations described herein. Indeed, each software component may be fully or partially written or described in any appropriate computer language including C, C++, Java, Visual Basic, assembler, Perl, any suitable version of 4GL, as well as others. It will be understood that while portions of the software illustrated in FIG. 1 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate. In the illustrated environment 100, processor 118 executes one or more hosted applications 122 on the server 102.

At a high level, each of the one or more hosted applications 122 is any application, program, module, process, or other software that may execute, change, delete, generate, or otherwise manage information according to the present disclosure, particularly in response to and in connection with one or more requests received from servers 140*a* and 140*b* or the illustrated clients 135*a-b* and their associated client applications 144 or from other servers or components through a network 112. In certain cases, only one hosted application 122 may be located at a particular server 102. In others, a plurality of related and/or unrelated hosted applications 122 may be stored at a single server 102, or located across a plurality of other servers 102, as well.

In certain cases, environment 100 may implement a composite hosted application 122. Additionally, the hosted applications 122 may represent web-based applications accessed and executed by servers 140*a* and 140*b* or remote clients 135*a-b* or client applications 144 via the network 112 (e.g., through the Internet). Further, while illustrated as internal to server 102, one or more processes associated with a particular hosted application 122 may be stored, referenced, or executed remotely. For example, a portion of a particular hosted application 122 may be a web service associated with the application that is remotely called, while another portion of the hosted application 122 may be an interface object or agent bundled for processing at a remote client 135. Moreover, any or all of the hosted applications 122 may be a child or sub-module of another software module or enterprise application (not illustrated) without departing from the scope of this disclosure. Still further, portions of the hosted application 122 may be executed by a user working directly at server 102, as well as remotely at client 135.

As illustrated, processor 118 can also execute a cache module 104 that provides services for applications such as hosted application 122, client application 144, or servers 140*a* and 140*b* and clients 135 within network 112. In some implementations, the cache module 104 can be executed by a different processor or server external to server 102, such as by servers 140*a* and 140*b* communicably coupled to server 104 through network 112. The cache module 104 can provide interfaces, modules, services, or metadata definitions that enable remote systems to access the configuration data 126 stored in memory 120 of the server 102. The cache module 104 can, in some instances, manage all read and write processes to the configuration data. For example, if server 102 is designated as a controller system in a distributed landscape, the cache module 104 can manage and process incoming requests to retrieve, update, or access configuration data 126 stored at the server 102.

In general, the server 102 also includes memory 120 for storing data and program instructions. Memory 120 may include any memory or database module and may take the form of volatile or non-volatile memory including, without limitation, magnetic media, optical media, random access memory (RAM), read-only memory (ROM), removable media, or any other suitable local or remote memory component. Memory 120 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the server 102 and its one or more hosted applications 122.

Memory 120 can also store data objects such as configuration data 126. The configuration data 126 can be any data used by one or more systems associated with a business process or data used to perform tasks as part of a business solution. For example, multiple systems, including servers 140*a*, 140*b* and 102, can be used in a distributed landscape in connection with a business process. The plurality of systems may need to access shared configuration data to perform tasks associated with the business process. Accordingly, the configuration data can be stored at a centralized server communicably coupled to the other systems in the distributed landscape. In some instances, the centralized server is a controller system for maintaining and updating the configuration data. For example, if server 102 is designated as a controller system, an original version of configuration data 126 is stored and maintained in memory 120. Other systems such as servers 140*a* and 140*b* can send requests to server 102 to access the configuration data 126. If one of the servers 140*a* and 140*b* modifies the configuration data 126, the changes are replicated in the original version of the configuration data 126 at server 102 accordingly.

In a distributed landscape, multiple systems may need access to the same configuration data. In some implementations, the configuration data is distributed to all systems that need the information. Although the controller system maintains the original version of the configuration data 126, each of the systems in the distributed landscape can store a version of the configuration data locally. The local version of the configuration data at each system may be updated through optimal on-demand refresh cycles with the controller system. The replication of configuration data at each system can minimize remote call times and free network resources for other uses.

In some implementations, the on-demand refresh cycles for configuration data stored remotely at non-controller systems can be facilitated using cache metadata 124. Cache metadata 124 can include any data describing the configuration data stored at server 102. In some instances, cache metadata 124 includes a cache service and a timestamp associated with the most recent change to the configuration data stored locally. The timestamp can be used to determine whether configuration data at a particular system is up-to-date with respect to original configuration data at the controller system, and whether additional updates of configuration data are required at the local system.

Further, improved scalability can be achieved from replicating configuration data at each system as well as ensuring that all systems contain similar components so that any system can function as the controller system at a given time. In other words, each of the servers 140*a* and 140*b* can include similar components as server 102. Accordingly, servers 140*a* or 140*b* can also function as a controller system and maintain an original version of the configuration data locally. In certain instances, however, only one system is designated as a controller system at any given time.

The illustrated environment of FIG. 1 also includes one or more clients 135. Each client 135 may be any computing device operable to connect to or communicate with at least the servers 102, 140*a* and 140*b* and/or via the network 112 using a wireline or wireless connection. Further, as illustrated in FIG. 1, client 135*a* includes a processor 146, an interface 142, a graphical user interface (GUI) 160*b*, a client application 144, and a memory 150. In general, client 135*a* comprises an electronic computer device operable to receive, transmit, process, and store any appropriate data associated with the environment 100 of FIG. 1. It will be understood that there may be any number of clients 135 associated with, or external to, environment 100. For example, while illustrated environment 100 includes client 135*a*, alternative implementations of environment 100 may include multiple clients communicably coupled to the server 102, or any other number of clients suitable to the purposes of the environment 100. Additionally, there may also be one or more additional clients 135 external to the illustrated portion of environment 100 that are capable of interacting with the environment 100 via the network 112. Further, the term "client" and "user" may be used interchangeably as appropriate without departing from the scope of this disclosure. The term "client" may also refer to any computer, application, or device, such as a mobile device, that is communicably coupled to one or more servers through a network 112. Moreover, while each client 135 is described in terms of being used by a single user, this disclosure contemplates that many users may use one computer, or that one user may use multiple computers.

The GUI 160 associated with client 135*a* comprises a graphical user interface operable to, for example, allow the user of client 135*a* to interface with at least a portion of the platform for any suitable purpose, such as creating, preparing, requesting, or analyzing data, as well as viewing and accessing source documents associated with business transactions. Generally, the GUI 160 provides the particular user with an efficient and user-friendly presentation of business data provided by or communicated within the system. The GUI 160 may comprise a plurality of customizable frames or views having interactive fields, pull-down lists, and buttons operated by the user. GUI 160 may also provide general interactive elements that allow a user to access and utilize various services and functions of application 144. The GUI 160 is often configurable, supports a combination of tables and graphs (bar, line, pie, status dials, etc.), and is able to build real-time portals, where tabs are delineated by key characteristics (e.g., site or micro-site). Therefore, the GUI 160 contemplates any suitable graphical user interface, such as a combination of a generic web browser, intelligent engine, and command line interface (CLI) that processes information in the platform and efficiently presents the results to the user visually.

As used in this disclosure, client 135 is intended to encompass a personal computer, touch screen terminal, workstation, network computer, kiosk, wireless data port, smart phone, personal data assistant (PDA), one or more processors within these or other devices, or any other suitable processing device. For example, each client 135 may comprise a computer that includes an input device, such as a keypad, touch screen, mouse, or other device that can accept user information, and an output device that conveys information associated with the operation of the server 102 (and hosted application 122) or the client 135 itself, including digital data, visual information, the client application 144, or the GUI 160. Both the input and output device may include fixed or removable storage media such as a magnetic storage media, CD-ROM, or other suitable media to both receive input from and provide output to users of client 135 through the display, namely, the GUI 160.

While FIG. 1 is described as containing or being associated with a plurality of elements, not all elements illustrated within environment 100 of FIG. 1 may be utilized in each alternative implementation of the present disclosure. For example, although FIG. 1 depicts a server-client environment implementing a hosted application at server 102 that can be accessed by client computer 135, in some implementations, server 102 executes a local application that features an application UI accessible to a user. Further, server 102 may be included within the network 112 as part of an on-demand context solution, for example. Additionally, one or more of the elements described herein may be located external to environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Figure 2:
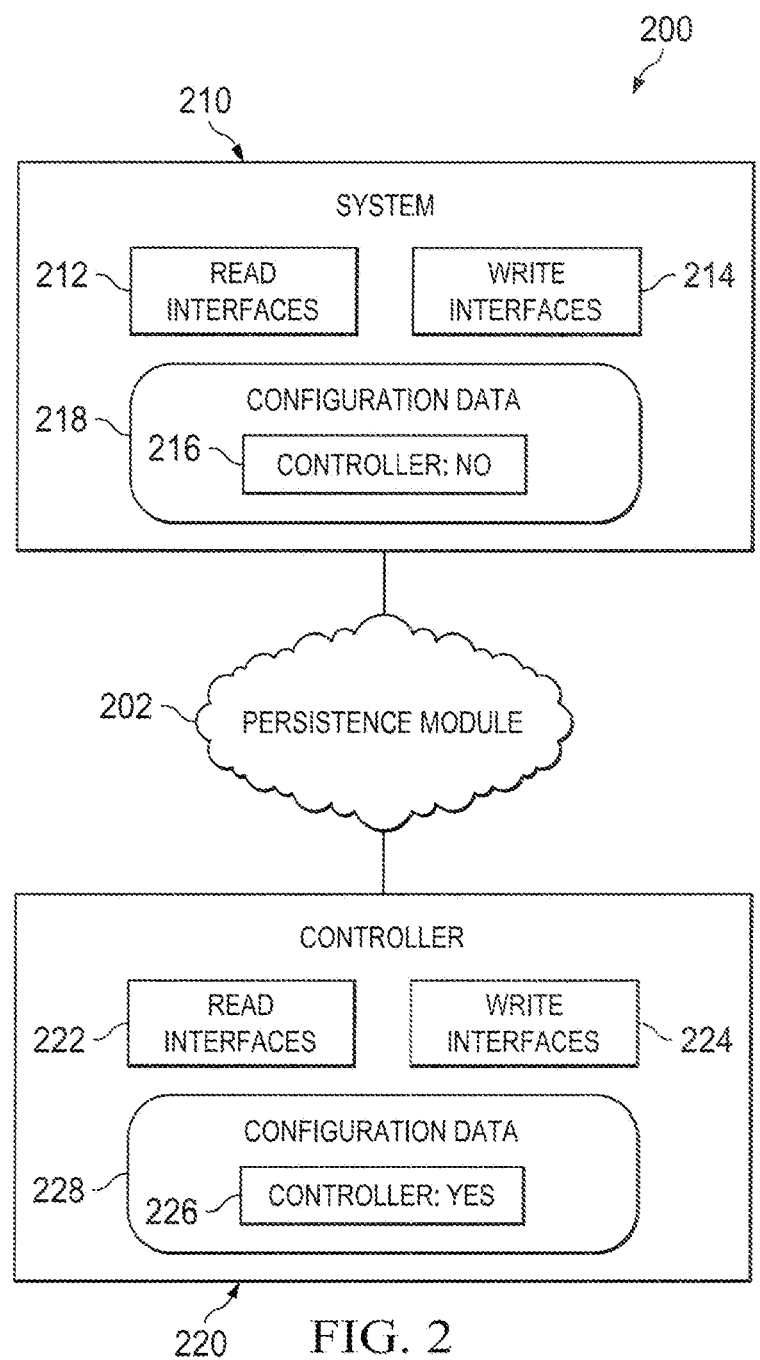
FIG. 2 illustrates an example diagram of systems sharing symmetric software for transparent caching in a distributed landscape using an environment, such as the example environment described in FIG. 1.

FIG. 2 depicts an example diagram 200 of systems sharing symmetric software for transparent caching in a distributed landscape. In some implementations, a plurality of systems can be used to provide components or solutions for a business process. The systems in the distributed landscape may, in some instances, access, update, or modify configuration data as needed to perform various tasks in a business process. One of the plurality of systems can be used as a controller system for the purpose of maintaining the configuration data and managing requests to read and write the configuration data. In certain implementations, transparent caching of the distributed environment can be facilitated by using systems having identical or similar hardware components such that any or most of the systems in the distributed environment can function as the controller system. In some instances, however, only one system functions as the controller system at a time.

For example, as seen in FIG. 2, a system 210 and a controller 220 can be communicably coupled through a communication channel. In the illustrated example, the controller 220 can be a system identical or similar to any other system in the distributed environment, such as system 210. Both the system 210 and controller 220 include similar components. For example, the system 210 can include read interfaces 212 and write interfaces 214 to update data stored locally at the system 210 while the controller 220 can also include read interfaces 222 and write interfaces 214 to perform similar functions at the controller 220. Further, both the system 210 and controller 220 include memory for storing configuration data 218 and 228.

As described above, the controller 220 is used to maintain the configuration data used by system 210 and the other systems in the distributed environment. Accordingly, the entirety of the original configuration data 228 is stored and maintained at the controller system 220, for example, as long as the controller system 220 is designated as the controller. System 210 and other systems in the distributed environment can be configured to communicate with the controller 220 in order to send requests to the controller 220 or obtain updates regarding the configuration data 228 stored at the controller 220. In some implementations, however, the configuration data 228 is also replicated, at least temporarily, in all systems that require access to the configuration data. As depicted in FIG. 2, the system 210 also stores a copy of the configuration data 218 locally. The system 210 can then update its copy of the configuration data 218 through optimal on-demand refresh cycles with the controller system 220. Accordingly, from the perspective of the system 210, the configuration data is persisted and transparently cached.

Further, an identical or substantially similar persistence module 202 is shared between the system 210 and controller 220. In some instances, a single version of the persistence module 202 for managing and accessing configuration data is executed at the system 210 and controller 220. In other words, each system in the distributed environment shares identical or similar coding for the logic and persistence functionality used in maintaining and accessing configuration data. As a result, efficient caching of configuration data can be achieved with minimal coding complexity. Further, the sharing of the same persistence module versions across multiple systems improves scalability and safety by allowing any of the systems in the distributed environment having the same the persistence module to be designated and configured as a controller system at any time. Accordingly, as described below in connection with FIG. 6, the controller designation for the distributed landscape can be automatically and seamlessly switched from one system 220 to a different system 210. In some implementations, a flag at each system can be used to indicate whether a particular system is designated as a controller system. In the illustrated example, the system 210 includes an internal flag 216 that indicates that system 210 is not designated as a controller while controller 220 includes an internal flag 226 indicating that controller 220 is designated as the controller in a distributed environment.

Figure 3:
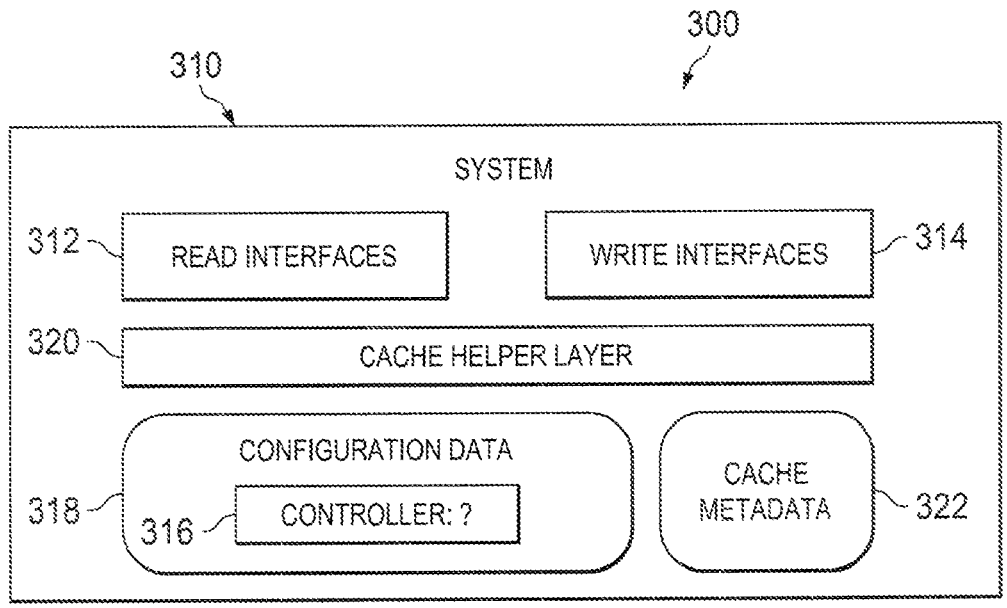
FIG. 3 illustrates an example diagram of a system configured to store and manage configuration data in a distributed landscape with an environment, such as the example environment described in FIG. 1.

FIG. 3 depicts another example diagram 300 of a system 310 configured to store and manage configuration data in a distributed landscape. In some implementations, since the systems in the distributed landscape share identical software, no additional database cache may be used. The original persistence of the specific data can be re-used. The system 310 can include read interfaces 312 and write interfaces 314 for accessing and modifying configuration data while storing a local version of configuration data 318. As described above in connection with FIG. 2, a particular system, such as system 310, may not be designated as a controller system but can still store a replicated version of the configuration data 318 locally while the original version of the configuration data can be stored at another system currently designated as the controller.

In some implementations, changes to the original configuration data are processed and maintained at the controller system, and the non-controller systems request updates to their locally stored versions of the configuration data. As seen in FIG. 3, a cache helper layer 320 can be used to monitor and manage the local configuration data 318 and perform tasks required to keep the local configuration data 318 updated. In some instances, the cache helper layer 320 is an object-oriented, lightweight helper layer used to govern and encapsulate read/write processes to the configuration data 318. One of the tasks that can be performed by the cache helper layer 320 is coordinating updates to the local configuration data 318 retrieved from a controller system. Accordingly, the cache helper layer 320 can store a unique identifier for a particular set of tables that need to be cached, an original system associated with the set of tables, and a normalized timestamp of the last update to the configuration data. The cache helper layer 320 can then initiate a cache update process at a specific time to update the configuration data stored locally at the system 310.

Figure 4:
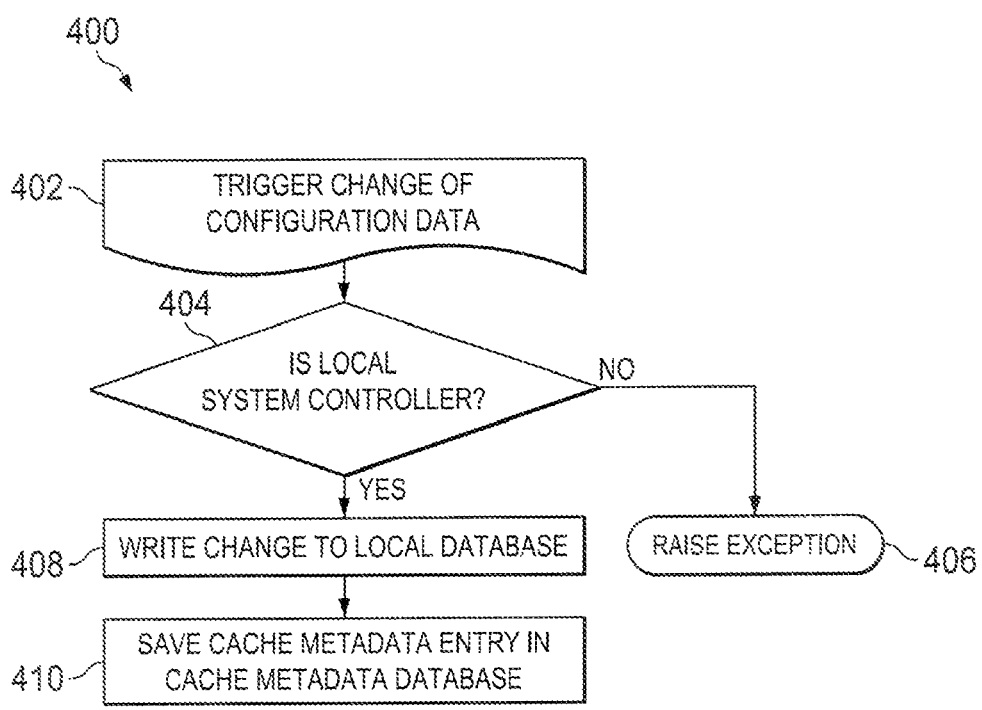
FIG. 4 illustrates a process for performing write operations at a system in a distributed landscape using an environment, such as the example environment described in FIG. 1.
Figure 5:
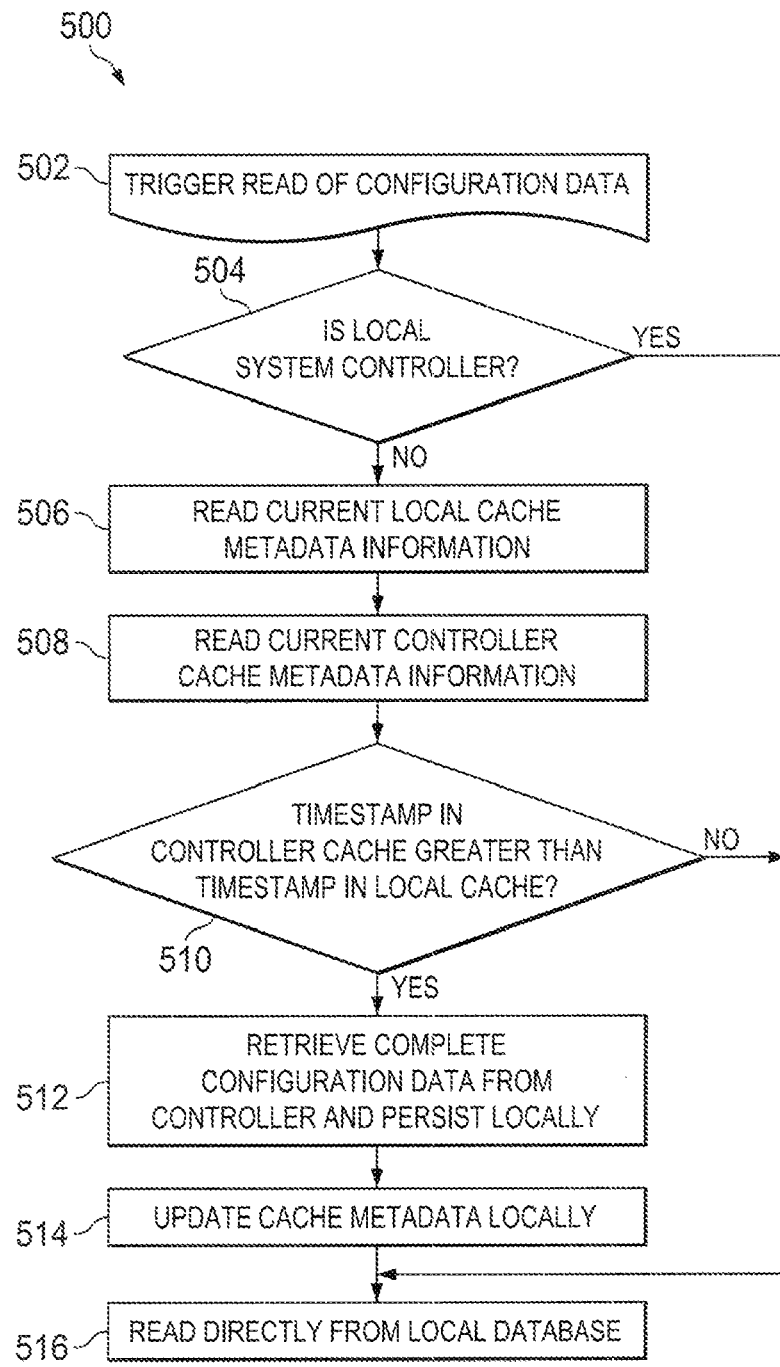
FIG. 5 illustrates a process for performing read operations at a system in a distributed landscape using an environment, such as the example environment described in FIG. 1.
Figure 6:
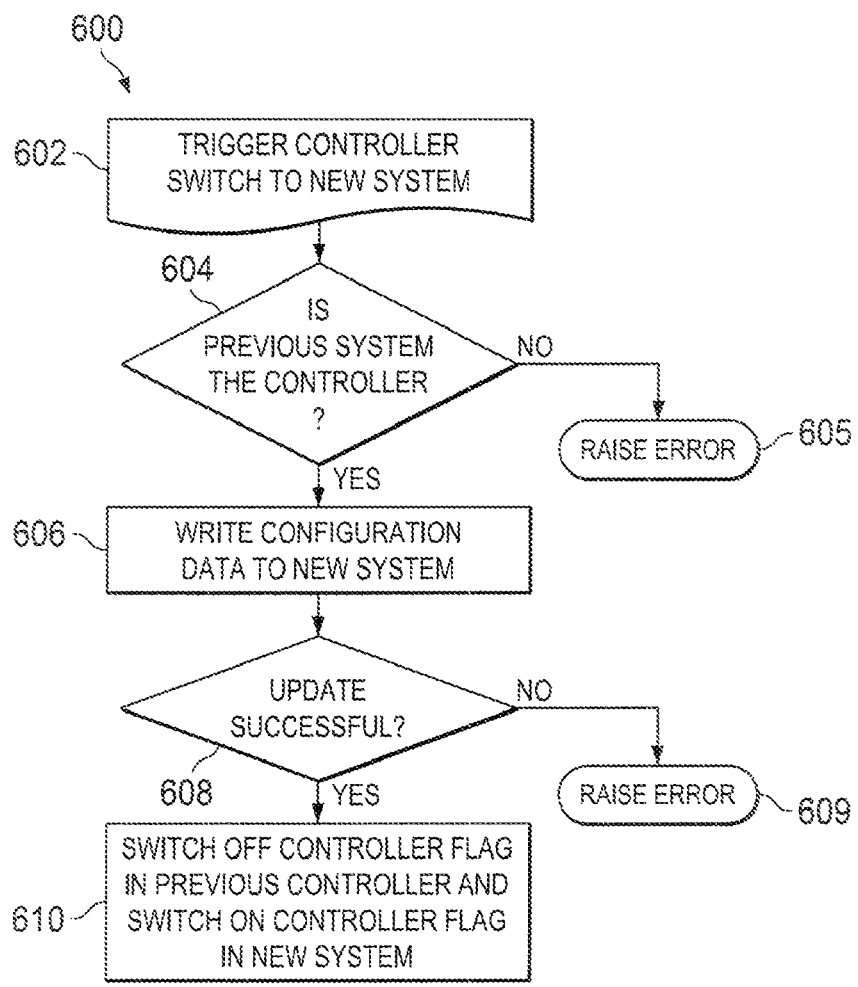
FIG. 6 illustrates a process for switching the controller for a distributed landscape from a previous system to a new system using an environment, such as the example environment described in FIG. 1.
Figure 7:
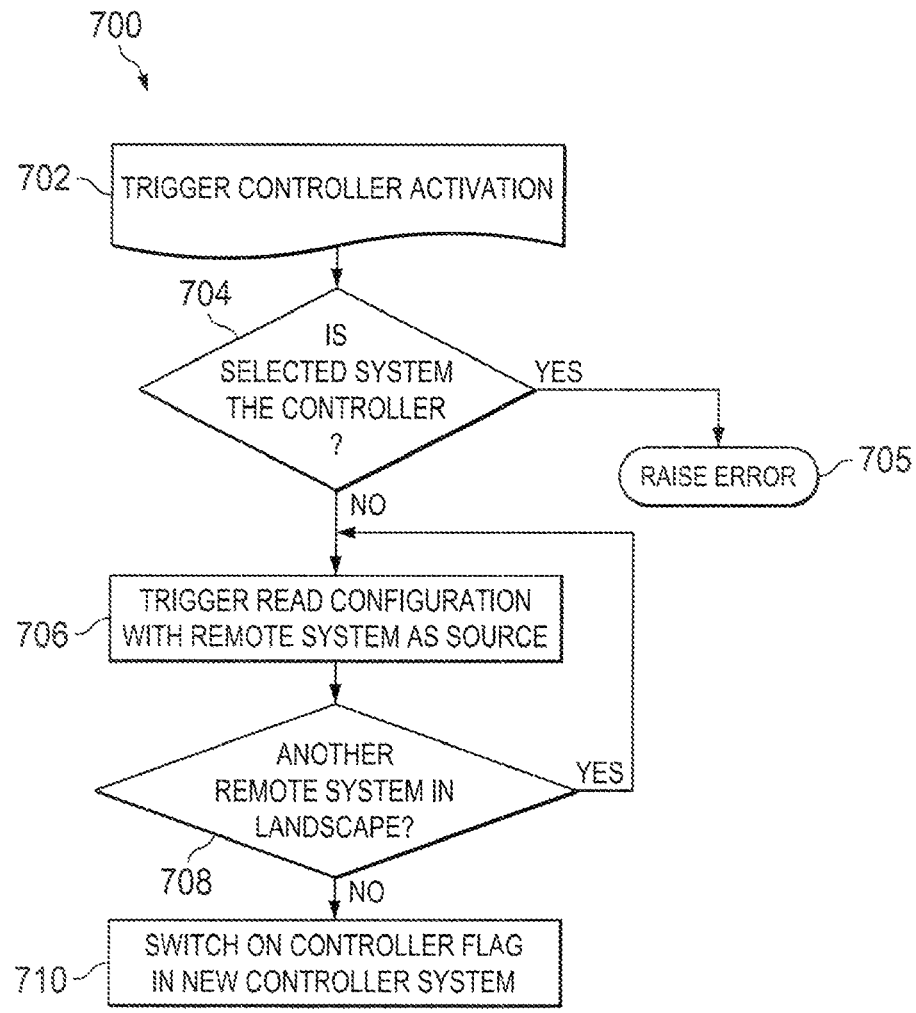
FIG. 7 illustrates a process for activating a system as the controller for a distributed landscape using an environment, such as the example environment described in FIG. 1.

The transparent caching implementation of the present disclosure can include various processes, such as write operations as shown in FIG. 4, read operations as shown in FIG. 5, switching controllers in a distributed landscape as shown in FIG. 6, and activating a particular system as a controller as shown in FIG. 7. The processes depicted in FIGS. 4-7 can be implemented with and/or by components described above in connection with FIGS. 1-3. FIG. 4 depicts an example process 400 for performing a write operation in the transparent caching mechanism. In a distributed landscape, the controller system manages the original version of configuration data while other non-controller systems access the controller system in order to retrieve updates to local versions of the configuration data. Accordingly, since configuration data is changed at the controller, the write processes performed at non-controller systems may not include write processes other than cache updates with newer data. At a controller system, however, each update to configuration data can be recorded into the cache metadata persistence at the controller. In order to maintain consistency of write operations and metadata update transactions, the actual persistence is modularized so that higher level applications, such as user interface level applications, are not allowed to directly write data into the configuration data persistence. In some implementations, a clean interface can be implemented as a façade to ensure that all changes are recorded properly in the metadata persistence.

The process 400 illustrated in FIG. 4 represents a process for performing write operations at a particular system in a distributed landscape. First, a change to configuration data can be identified at a particular system at 402. In some implementations, the change to configuration data comprises addition of a new data set to a configuration table, which can be linked to a particular cache service. If the particular system is not identified as a controller at 404, an exception is raised at 406. If the particular system is identified as a system controller at 404, a write operation is performed to save the change to configuration data in a local database at the controller at 408. The write operation can include persisting the new data set in the configuration table linked to the cache service. Further, a cache metadata entry can then be saved in the cache metadata database at 410. In certain implementations, the cache metadata entry includes both the cache service and the timestamp associated with the configuration data change. The cache metadata entry can be used to determine when a particular configuration data change occurred or when the most recent update to configuration data occurred to synchronize configuration data at other systems in the distributed landscape.

FIG. 5 depicts an example process 500 for performing a read operation in the transparent caching mechanism. A read operation on configuration data can be triggered at 502. If it is determined that the present system is currently designated as the controller for the original configuration data at 504, the read operation is performed directly on the local database at 516 because the configuration data stored at the controller is the original version. If, however, it is determined that the present system is not the controller at 504, the present system will need to synchronize with the original version of the configuration data stored at the controller.

First, the current local cache metadata information is read at 506. As described above in connection with FIG. 4, cache metadata information can include cache metadata entries that indicate a cache service and/or timestamp associated with the most recent change to configuration data. Accordingly, reading the current local cache metadata information can help identify the time of the most recent change to the local configuration data stored at the present system. Next, the current controller cache metadata information is read at 508. The reading of the controller cache metadata information is used to determine the time of the most recent change to the original configuration data stored at the controller.

The timestamp associated with the local cache is then compared to the timestamp associated with the controller cache at 510. If the timestamp associated with the controller cache is not greater (or prior in time) than the timestamp associated with the local cache, then the local cache is a current or newer version of the configuration data compared to the configuration data at the controller, and the configuration data may accordingly be read directly from the local storage at 516. If the timestamp associated with the controller cache is greater (i.e., more recent in time) than the timestamp associated with the local cache, then the local cache is outdated relative to the original configuration data at the controller. Accordingly, the local system retrieves complete configuration data from the controller and persists the configuration data locally at 512. Here, the local system can perform an optimal on-demand refresh cycle to obtain the updated configuration from the controller through a network. Further, the cache metadata at the local system can be updated at 514. The update of the cache metadata can include storing in memory the timestamp associated with the retrieval of current configuration data from the controller as well as the cache service associated with the configuration data. After the configuration data has been updated at the local cache, the configuration data can be read directly at 516.

The sharing of identical versions of software for data persistence at each system in a distributed landscape allows a symmetric implementation for transparent caching of configuration data. Accordingly, each system in a distributed landscape can potentially function as the controller for other systems in the landscape. In some instances, a system previously functioning as the controller system can relinquish the controller function to a different system in the landscape. Switching the designated controller can include switching off the controller flag in the old controller system and switching on the controller flag in the new controller system. The new controller system, however, may be storing outdated configuration data because the previous controller system maintained all current configuration data while non-controller systems were only updated after triggering an update process when needed. The process for switching the controller system from one system to a different system may vary depending on whether the previous controller is available during the switch.

FIG. 6 illustrates a process 600 for switching the controller function from one system to a different system when the previous controller is online or available during the switch process. If the previous controller is available when a new system is being designated as the controller system, the configuration data in the new controller can be synched with the configuration data in the old controller by triggering an automatic update for all known cache services from the new controller. As seen in FIG. 6, the switch of the controller system from a previous system to a new system is triggered at 602. The selection of the particular system to assume the functions of the controller can be selected manually from a user or determined automatically based on various factors such as hardware specifications or available resources associated with the selected system. Next, it is determined whether the previous system is the current controller at 604. If the previous system is not the current controller, the switch cannot be performed and an error is raised at 605. If the previous system is the current controller, the configuration data from the previous controller is written to the new system at 606. In some implementations, a caching mechanism such as the write process described in connection with FIG. 4 is used to automatically synch the configuration data in the new system. If it is determined that the update is not successful at 608, an error is raised at 609. If the update is successful, however, the switch is finalized by switching off the controller flag in the previous controller and switching on the controller flag in the new system at 610.

The symmetric implementation of the multiple systems in a distributed landscape allows any of the systems to function as the controller. Each of the systems in the distributed landscape can be configured to store the configuration data for the distributed landscape as well as provide the necessary components for maintaining persistence of the configuration data. Further, the same persistence software versions can be used at each system in the distributed landscape. Accordingly, the controller for a distributed landscape environment can be seamlessly and automatically switched from one system to another without the need to move or map the configuration data at the previous controller with the configuration data at the new controller.

FIG. 7 illustrates a process 700 for activating a particular system as the controller when no previous controller is available for synching configuration data. As described above, each system in the distributed landscape can be configured to store a version of the configuration data locally at the system. Although a controller that contains the original configuration data may not be available, various versions of the configuration data may be found across the different systems in the landscape. Accordingly, the system designated as the new controller performs cache update procedures for all cache services at every system in the landscape in order to obtain the entirety of the configuration data distributed among the different systems.

As depicted in FIG. 7, activation of a particular system as the controller is triggered at 702. The selection of a particular system can be received manually from a user or determined automatically based on various factors such as hardware specifications or available resources associated with the selected system. The system selected for activation as a controller is checked to determine whether the selected system is a controller at 704. If the selected system is a controller, there is no need to continue with the activation process and an error is raised at 705. If the selected system is not a controller, activation continues and read operations are performed on a remote system as the source at 706. Although the remote system was not previously a controller, it stores at least one version of the configuration data and can be accessed to retrieve the configuration data stored at the remote system. In some instances, the read operations are performed using a process similar to the process described in connection with FIG. 5.

A determination is made whether there are other remote systems in the distributed landscape at 708. The read operations are performed for each remote system found in the distributed landscape to retrieve existing configuration data stored locally at each remote system and store the configuration data as an original version of the configuration data at the new controller system. If there are other remote systems in the landscape, the read operations are repeated for each remote system to retrieve configuration data from the remote system. After each remote system has been accessed for configuration data, the activation of the new controller is completed by switching on the controller flag in the new controller system at 710.

The preceding figures and accompanying description illustrate example processes and computer implementable techniques. But environment 100 (or its software or other components) contemplates using, implementing, or executing any suitable technique for performing these and other tasks. It will be understood that the processes 400, 500, 600, and 700 are for illustration purposes only and that the described or similar techniques may be performed at any appropriate time, including concurrently, individually, or in combination. In addition, many of the steps in these processes may take place simultaneously and/or in different orders than as shown. Moreover, environment 100 may use processes with additional steps, fewer steps, and/or different steps, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer implemented method performed by one or more processors for providing transparent caching of configuration data in a distributed computing landscape, the method comprising:
    identifying two or more systems of the distributed computing landscape, each of the systems selectively comprising a controller system of the distributed computing landscape such that only one of the two or more systems comprises the controller system at a particular time;
    receiving at a first system a read request of original configuration data stored at a second system, the two or more systems including the first system and the second system;
    setting a flag associated with the second system to indicate the second system is designated as the controller system and setting a flag associated with the first system to indicate the first system is not designated as the controller system;
    based on setting the flag associated with the first system to indicate the first system is not designated as the controller system, identifying a first timestamp associated with local configuration data, the local configuration data stored locally at the first system, wherein the first timestamp comprises a recorded time that the local configuration data was last updated;
    determining a second timestamp associated with the original configuration data, wherein the second timestamp comprises a recorded time that the original configuration data was last updated;
    determining that the second timestamp is at an arbitrary time that is later in time than the first timestamp;
    retrieving a copy of the original configuration data from the second system for storage locally in place of the local configuration data based at least in part on the determination that the second timestamp is later in time than the first timestamp;
    updating the first timestamp with a current timestamp associated with a time the copy of the original configuration data was retrieved from the second system;
    maintaining persistence of the original configuration data at a persistence module shared between the first system and the second system by communicably coupling the first system directly to the second system with identical persistence software;
    determining that the second system is offline, and in response, identifying resources and hardware specifications associated with each remaining system of the two or more systems of the distributed computing landscape;
    evaluating the resources and hardware specifications associated with each of the two or more systems of the distributed computing landscape;
    based on the evaluation, selecting the first system of the two or more systems of the distributed computing landscape; and
    in response to selecting the first system, switching the controller system from the second system to the first system by updating the flag associated with the first system to indicate the first system is designated as the controller system and updating the flag associated with the second system to indicate the second system is not designated as the controller system, wherein the second system is available and fully functional during the switching.

2. The method of claim 1, wherein retrieving the copy of the original configuration data includes retrieving only portions of the original configuration data that are different from the local configuration data.

3. The method of claim 1, wherein setting the flag associated with the second system to indicate the second system is designated as the controller system further comprises the second system is configured to manage the original configuration data for a plurality of other systems, and wherein setting the flag associated with the first system to indicate the first system is not designated as the controller system further comprises indicating the first system is designated as a non-controller system.

4. The method of claim 1 further comprising:
receiving a request to designate the first system as a controller system;
retrieving the original configuration data from the second system; and
storing the original configuration data locally.

5. The method of claim 4 further comprising:
identifying a change to the original configuration data;
performing a write operation on the local configuration data to implement the change to the original configuration data; and
storing cache metadata associated with the change, the cache metadata including a timestamp associated with a time the write operation was performed.

6. The method of claim 4 further comprising:
after switching the controller system from the second system to the first system, receiving a request from the second system for refreshing configuration data stored at the second system; and
allowing the second system to retrieve configuration data stored locally at the first system.

7. The method of claim 1, wherein the first system includes a cache management layer for maintaining persistence of configuration data stored at the first system.

8. The method of claim 1, wherein the controller system performs one or more of managing, updating, handling and caching requests for the original configuration data for a plurality of other systems in the distributed landscape that are associated with one of a business process, application, or solution.

9. The method of claim 1, further comprising:
updating the original configuration data through on-demand refresh cycles by the controller system using cache metadata.

10. The method of claim 1, further comprising:
in response to identifying the two or more systems of the distributed computing landscape, determining that none of the systems of the two or more systems are available for synching the original configuration data to the second system;
in response to determining that none of the systems of the two or more systems are available for synching the original configuration data to the second system, receiving partial configuration data from each remaining system of the two or more systems of the distributed computing landscape; and
obtaining the original configuration data to store at the second system based on the partial configuration data received from each remaining system of the two or more systems of the distributed computing landscape.

11. A computer program product comprising a non-transitory, tangible storage medium, the product comprising computer readable instructions for causing one or more processors to perform operations comprising:
identifying two or more systems of the distributed computing landscape, each of the systems selectively comprising a controller system of the distributed computing landscape such that only one of the two or more systems comprises the controller system at a particular time;
receiving at a first system a read request at a first system, the read request comprising a request for original configuration data stored at a second system, the two or more systems including the first system and the second system;
setting a flag associated with the second system to indicate the second system is designated as the controller system and setting a flag associated with the first system to indicate the first system is not designated as the controller system;
based on setting the flag associated with the first system to indicate the first system is not designated as the controller system, identifying a first timestamp associated with local configuration data, the local configuration data stored locally at the first system, wherein the first timestamp comprises a recorded time that the local configuration data was last updated;
determining a second timestamp associated with the original configuration data, wherein the second timestamp comprises a recorded time that the original configuration data was last updated;
determining that the second timestamp is at an arbitrary time that is later in time than the first timestamp;
retrieving a copy of the original configuration data from the second system for storage locally in place of the local configuration data based at least in part on the determination that the second timestamp is later in time than the first timestamp;
updating the first timestamp with a current timestamp associated with a time the copy of the original configuration data was retrieved from the second system;
maintaining persistence of the original configuration data at a persistence module shared between the first system and the second system by communicably coupling the first system directly to the second system with identical persistence software;
determining that the second system is offline, and in response, identifying resources and hardware specifications associated with each remaining system of the two or more systems of the distributed computing landscape;
evaluating the resources and hardware specifications associated with each of the two or more systems of the distributed computing landscape;
based on the evaluation, selecting the first system of the two or more systems of the distributed computing landscape; and
in response to selecting the first system, switching the controller system from the second system to the first system by updating the flag associated with the first system to indicate the first system is designated as the controller system and updating the flag associated with the second system to indicate the second system is not designated as the controller system, wherein the second system is available and fully functional during the switching.

12. The computer program product of claim 11, wherein retrieving the copy of the original configuration data includes retrieving only portions of the original configuration data that are different from the local configuration data.

13. The computer program product of claim 11, wherein setting the flag associated with the second system to indicate the second system is designated as the controller system further comprises the second system is configured to manage the original configuration data for a plurality of other systems, and wherein setting the flag associated with the first system to indicate the first system is not designated as the controller system further comprises indicating the first system is designated as a non-controller system.

14. The computer program product of claim 11, the operations further comprising:
receiving a request to designate the first system as a controller system;
retrieving the original configuration data from the second system; and
storing the original configuration data locally.

15. The computer program product of claim 14, the operations further comprising:
identifying a change to the original configuration data;
performing a write operation on the local configuration data to implement the change to the original configuration data; and
storing cache metadata associated with the change, the cache metadata including a timestamp associated with a time the write operation was performed.

16. The computer program product of claim 14, the operations further comprising:
after switching the controller system from the second system to the first system, receiving a request from the second system for refreshing configuration data stored at the second system; and
allowing the second system to retrieve configuration data stored locally at the first system.

17. A distributed computing environment, comprising:
a first computing system comprising:
memory operable to store local configuration data and at least a portion of a persistence module; and
one or more processors operable execute the persistence module, the persistence module when executed to:
identify two or more systems of the distributed computing landscape, each of the systems selectively comprising a controller system of the distributed computing landscape such that only one of the two or more systems comprises the controller system at a particular time;
receive at the first computing system a read request of original configuration data stored at a second computing system communicably coupled to the first computing system, the two or more systems including the first system and the second system;
set a flag associated with the second system to indicate the second system is designated as the controller system and set a flag associated with the first system to indicate the first system is not designated as the controller system;
based on setting the flag associated with the first system to indicate the first system is not designated as the controller system, identify a first timestamp associated with the local configuration data, wherein the first timestamp comprises a recorded time that the local configuration data was last updated;
determine a second timestamp associated with the original configuration data, wherein the second timestamp comprises a recorded time that the original configuration data was last updated;
determine that the second timestamp is at an arbitrary time that is later in time than the first timestamp;
retrieve a copy of the original configuration data from the second computing system for storage locally in place of the local configuration data based at least in part on the determination that the second timestamp is later in time than the first timestamp;
update the first timestamp with a current timestamp associated with a time the copy of the original configuration data was retrieved from the second computing system;
maintain persistence of the original configuration data at a persistence module shared between the first computing system and the second computing system by communicably coupling the first computing system directly to the second computing system with identical persistence software;
determine that the second system is offline, and in response, identifying resources and hardware specifications associated with each remaining system of the two or more systems of the distributed computing landscape;
evaluate the resources and hardware specifications associated with each of the two or more systems of the distributed computing landscape;
based on the evaluation, select the first system of the two or more systems of the distributed computing landscape; and
in response to selecting the first system, switch the controller system from the second system to the first system by updating the flag associated with the first system to indicate the first system is designated as the controller system and updating the flag associated with the second system to indicate the second system is not designated as the controller system, wherein the second system is available and fully functional during the switching.

18. The distributed computing environment of claim 17, the one or more processors further configured to:
receive a request to designate the first computing system as a controller system;
retrieve the original configuration data from the second computing system; and
store the original configuration data locally;

19. The distributed computing environment of claim 18, the one or more processors further operable to:
identify a change to the original configuration data;
perform a write operation on the local configuration data to implement the change to the original configuration data; and
store cache metadata associated with the change, the cache metadata including a timestamp associated with a time the write operation was performed.

20. The distributed computing environment of claim 18, the one or more processors further operable to:
after switching the controller system from the second system to the first system, receive a request from the second computing system for refreshing configuration data stored at the second computing system; and
allow the second computing system to retrieve configuration data stored locally at the first computing system.

21. The distributed computing environment of claim 17, wherein setting the flag associated with the second system to indicate the second system is designated as the controller system further comprises the second computing system is configured to manage the original configuration data for a plurality of other systems, and wherein setting the flag associated with the first system to indicate the first system is not designated as the controller system further comprises indicating the first computing system is designated as a non-controller system.

* * * * *